United States Patent [19]

Hehl

[11] Patent Number: 4,768,559
[45] Date of Patent: Sep. 6, 1988

[54] COOLING APPARATUS ON A PLASTICS INJECTION MOLDING MACHINE

[76] Inventor: Karl Hehl, Arthur-Hehl-Str. 32, D-7298 Lossburg-1, Fed. Rep. of Germany

[21] Appl. No.: 113,207

[22] Filed: Oct. 27, 1987

[30] Foreign Application Priority Data

Oct. 28, 1986 [DE] Fed. Rep. of Germany ....... 3636635

[51] Int. Cl.$^4$ .............................................. F16K 3/08
[52] U.S. Cl. ................................... 137/887; 137/883; 251/367
[58] Field of Search ............... 137/883, 884, 887, 269, 137/271, 625.4; 251/129.05, 129.11, 367

[56] References Cited

U.S. PATENT DOCUMENTS

| | | | |
|---|---|---|---|
| 1,549,758 | 8/1925 | Farmer | 137/887 X |
| 3,025,878 | 3/1962 | Hupp | 137/884 X |
| 3,974,857 | 8/1976 | Hehl | 137/271 X |
| 4,399,836 | 8/1983 | de Versterre et al. | 251/129.05 X |
| 4,700,885 | 10/1987 | Knebel | 137/625.41 X |

FOREIGN PATENT DOCUMENTS

1216890 12/1970 United Kingdom ........... 251/129.11

Primary Examiner—A. Michael Chambers
Assistant Examiner—John C. Fox
Attorney, Agent, or Firm—Foley & Lardner, Schwartz, Jeffery, Schwaab, Mack, Blumenthal & Evans

[57] ABSTRACT

The flow rates in the cooling circuits of the apparatus can be controlled with the aid of a computer by means of ceramic turning valves. The computer is connected to the central computer of a plastic injection molding machine. The valve body disks, lying under constant pressure via ceramic sealing surfaces against valve seat disks, can be turned by means of pulse-controlled electric motors. Each fitting has a valve channel between the channel section of the supply channel and the channel section of the discharge channel which is covered by a valve seat disk and which forms a valve chamber. This achieves the effect that the deviations from the set temperature in the temperature-critical zones can be substantially reduced with acceptable technical expenditure. The temperature constancy achieved may be maintained for a virtually unlimited time without appreciable maintenance work.

12 Claims, 5 Drawing Sheets

COOLING APPARATUS ON A PLASTICS INJECTION MOLDING MACHINE

BACKGROUND OF THE INVENTION

The invention relates to a cooling apparatus. In a known cooling apparatus (U.S. Pat. No. 3,974,857), the cooling circuits are controlled by means of stopcocks to be operated manually, it being possible to read off the approximate cooling requirement on scales indicating the suspension level of suspension bodies in vertical glass tube sections of the cooling circuits.

It was found in tests that the variation in the weight and dimensions of the moldings from one injection mold depends on the temperature constancy in the critical zones of the injection molding machine to a substantially higher degree then previously assumed and, in particular, on the temperature constancy of the injection mold and of the feed zones for feeding the granules into the plasticizing cylinder as well as on the temperature constancy of the pressure oil in the hydraulic circuit.

SUMMARY OF THE INVENTION

One object of the invention is to provide a cooling apparatus which can substantially reduce the deviations from the set temperature in the temperature-critical zones with an acceptable expenditure and which can maintain the temperature constancy for a virtually unlimited time without appreciable maintenance work.

It has been found that, with a design according to the invention, it is possible in particular to also suppress almost completely and for an unlimited time the adverse abrasive and corrosive effects of foreign substances dissolved in the cooling medium, in particular, in the cooling water, and solids deposited there.

An apparatus according to the invention can ensure by a cost-reducing interaction of injection-molding and valve-engineering measures, that the overall somewhat higher expenditure in terms of valve and control technology can be kept within limits.

In accomplishing the foregoing objects, there has been provided according to the present invention an apparatus for maintaining the temperature of cooling circuits of an injection molding machine, comprising a plurality of fittings connectable to one another to form the cooling circuits, each fitting comprising a supply channel section and a discharge channel section which are spaced from one another, the fittings being sealingly attached to one another so that their respective supply channel sections form a supply channel and their respective discharge channel sections form a discharge channel, each fitting further comprising a connection nozzle communicating with the supply channel and means for controlling the flow rate of cooling fluid through the supply channel section, comprising a stepping motor; means for controlling the operation of the stepping in response to detected cooling criteria; a valve channel positioned between the supply section and the connection nozzle; and a ceramic turning valve having a valve body disk with ceramic sealing surfaces, a valve seat disk positioned within the fitting, the valve body disk being in contact with the valve seat disk along its ceramic sealing surface, the valve seal disk being connected to the stepping motor for rotation thereby so as to rotate relative to the valve body disk, the valve seat disk being selectively rotatable by operation of the stepping motor so as to rotate relative to the valve body disk, whereby passage of cooling fluid from the connection nozzle to the supply channel section can occur when the valve seat disk is rotated the selected open positions relative to the valve body disk and whereby passage of cooling fluid is prevented when the valve seat disk is rotated to selected closed positioned relative to the valve body disk.

In another aspect of the present invention, the present invention provides a cooling circuit for an injection molding machine comprising an apparatus for maintaining the temperature of cooling circuits of an injection molding machine, comprising a plurality of fittings connectable to one another to form the cooling circuits, each fitting comprising a supply channel section and a discharge channel section which are spaced from one another, the fittings being sealingly attached to one another so that their respective supply channel sections form a supply channel and their respective discharge channel sections form a discharge channel, each fitting further comprising a connection nozzle communicating with the supply channel and means for controlling the flow rate of cooling fluid through the supply channel section, comprising a stepping motor; means for controlling the operation of the stepping motor in response to detected cooling criteria; a valve channel positioned between the supply section and the connection nozzle; and a ceramic turning valve having a valve body disk with ceramic sealing surfaces; a valve seat disk positioned within the fitting, the valve body disk being in contact with the valve seat disk along its ceramic sealing surface, the valve seal disk being connected to the stepping motor for rotation thereby so as to rotate relative to the valve body disk, the valve seat disk being selectively rotatable by operation of the stepping motor so as to rotate relative to the valve body disk, whereby passage of cooling fluid from the connection nozzle to the supply channel section can occur when the valve seat disk is rotated to selected open positions relative to the valve body disk and whereby passage of cooling fluid is prevented when the valve seat disk is rotated to selected closed positions relative to the valve body disk.

Further objects, features and advantages of the present invention will become apparent from the detailed description which follows, when considered together with the attached figures of drawing.

BRIEF DESCRIPTION OF THE DRAWINGS

The invention is explained below by an exemplary embodiment with reference to the figures of drawing, in which.

DETAILED DESCRIPTION OF THE PREFERRED EMBODIMENTS

The cooling apparatus cools zones of the plastic injection molding machine which require temperature control or are temperature-critical by means of a liquid medium, in particular, by means of tap water. It comprises a distribution and control unit (unit S in FIG. 1), to which several cooling circuits are connected and in which the zones or functional units requiring cooling are disposed (e.g. the injection mold, the oil of the hydraulic circuit to be temperature controlled in a cooler, the feed zone of the plastics granules coming from a storage space and passing into the plasticizing cylinder). The cooling circuits branch off from a common supply channel Z and open out into a common discharge channel A (shown in FIG. 4). Supply channel Z and discharge channel A are made up of fittings F of high-polymeric material, which are shaped as channel sections 13, 13' and are arranged in rows. In this arrangement, the channel sections 13 lying on one side form the supply channel Z and the channel sections 13' form the parallel discharge channel A. Each fitting has a connection nozzle 13'' for the feeding of the cooling medium into the cooling circuit and a connection nozzle 13''' for the return of the cooling medium into the discharge channel A. In this arrangement, the connection nozzle 13''' of the distribution unit are radially positioned with respect to the discharge channel and the connection nozzles 13''' are parallel to the connection nozzles 13'' for the feeding of the cooling medium into the cooling circuits are arranged between feed channel Z and discharge channel A, as can be seen in particular in FIG. 4.

Figure 4:
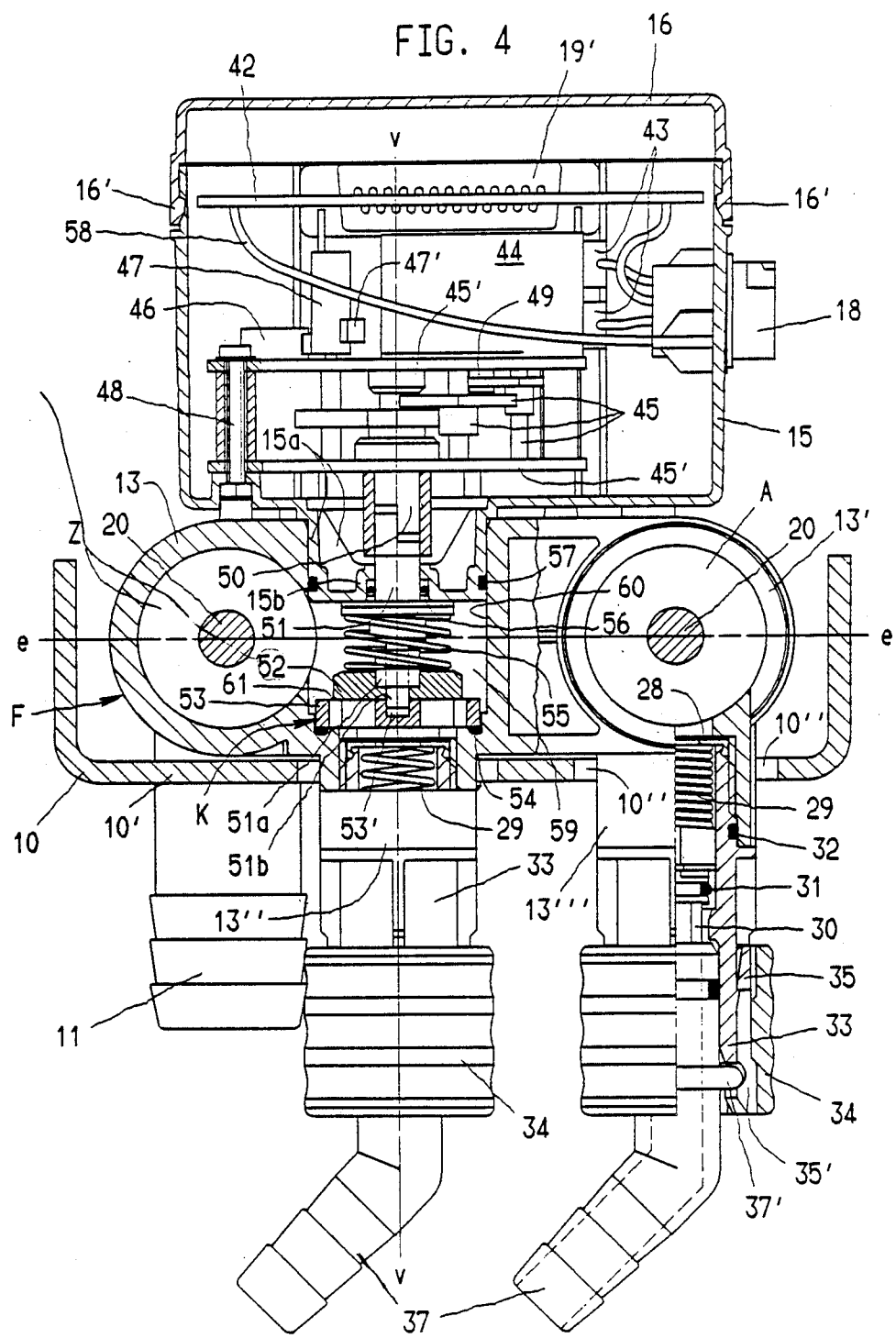
FIG. 4 is a sectional view along lines IV—IV of FIG. 2 in enlarged representation (right-hand channel section (13') is not in section)

The flow rates in the cooling circuits can be controlled with aid of a computer R, connected to the central computer of the plastics injection molding machine, by means of ceramic turning valves K (FIG. 4). The valve chambers 59 accommodating these ceramic turning valves K are bounded on either side by the channel sections 13, 13' of a fitting F and at the rear by a motor gear housing 15 (FIG. 4). To this extent, each fitting F forms the housing for a ceramic turning valve K, the axis of rotation v—v of which is coaxial to the neighboring connection nozzle 13''. The fittings F are axially fixed with respect to one another by special steel tie rods 20, which are arranged coaxially in the supply channel Z or respectively, discharge channel A and lie in a plane e—e which is perpendicular to the valve axis v—v and thus also perpendicular to the axes of all connection nozzles 13'', 13'''. The valve chambers 59 communicate with the supply channel Z via notches in the neighboring channel sections 13, which notches are symmetrical to the plane e—e, as can be seen in particular in FIG. 4. A cuboid motor gear housing 15, sealed off at the rear by a cover 16, is fixed to each fitting F by an element 48. In this arrangement, the side of the motor gear housing 15 facing the fitting F is parallel to the plane e—e (FIG. 4). In each motor gear housing 15 there is a printed circuit board 42 having electronic components 43, which is perpendicular to the valve axis v—v and arranged at the rear of a stepping motor 44 driving the ceramic turning valve K, the drive axle 49 of which is parallel to the valve axis v—v. The drive axle 49 meshes with a toothed wheel of a reduction gear 45, which is mounted between plates 45'. As seen in FIG. 4, an end position switch 46 for valve body dish 52 is switchable by means of a control cam 47' on a control axle 47. As can also be seen in FIG. 4, the output axle 50 of the reduction gear 45 is coupled to the drive axle 51 for the ceramic turning valve K by an axial coupling profile. The ceramic turning valve K consists of a ceramic valve seat disk 53 and a ceramic valve body disk 52, which is held under constant pressure against the disk 53 and which can be turned via the drive axle 51 with the aid of the stepping motor 44. In other words, it is driven by a pulse-controlled electric motor. The constant contact pressure of the valve seat disk 53 is generated with the aid of a pretensioned spiral spring 55, which surrounds the drive axle 51 and rests at the rear against the motor gear housing 15 in the region of a cylindrical hollow 15a. The pot-shaped element 15a projects centrally into a corresponding recess of the fitting F and bounds the valve chamber 59 by its face. At the same time, element 15a forms the central bearing 15b for the drive axle 51. For sealing, an outer sealing ring 57 and an inner sealing ring 56 are provided. A driving profile 51a of the drive axle 51 projects, as a driving coupling, into a corresponding recess of the valve body disk 52 in which it fits. The rotationally symmetrical end section 51b of the drive axle 51 enters a corresponding central recess 53' of the ceramic valve seat disk 53 and is centered there. The ceramic valve seat disk 53 is fixed so as not to rotate in the plastic fitting F. Two diametrical pins of the fitting F which enter in corresponding recesses of the valve seat disk 53 (not shown) fix fitting F to valve seal disk 53. A sealing ring 54, which is arranged in a annular groove in a support shoulder for the valve seat disk 53, is adapted to seal the valve chamber 59 with respect to the interior of the connection nozzle 13''. In this arrangement, the valve seat disk 53 is pressed via the valve body disk 52 by the pretensioned spiral spring 55 so that it is fixed against the rotation. Valve seat disk 53 and valve body disk 52 are designed in such a way that whenever the valve body disk 53 is turned, diametral, circular arc-shaped flow slits 61 of increasing or decreasing length are produced.

Figure 1:
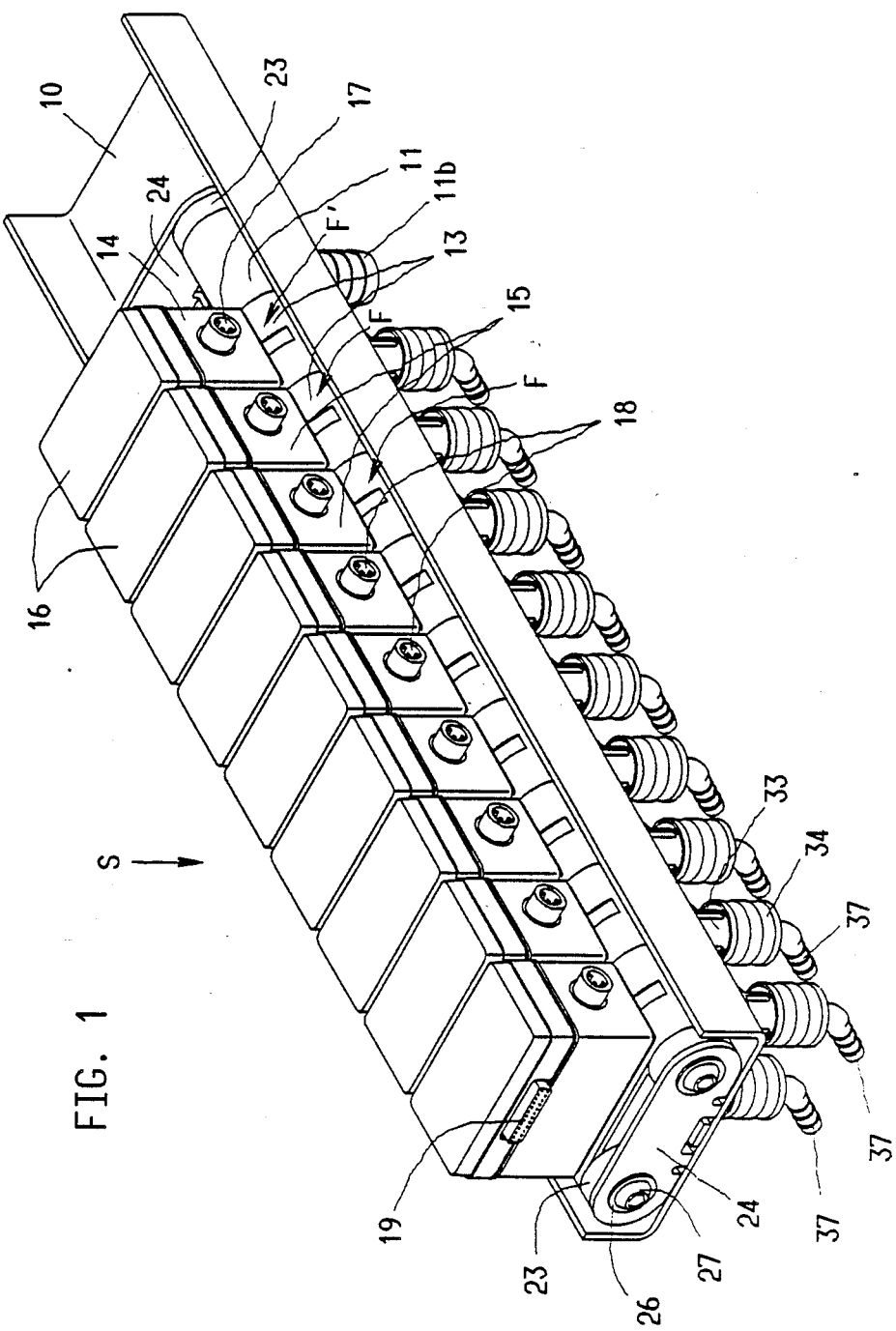
FIG. 1 is a perspective view of the distribution and control unit for the cooling circuits of the cooling apparatus (without sensor lines)
Figure 2:
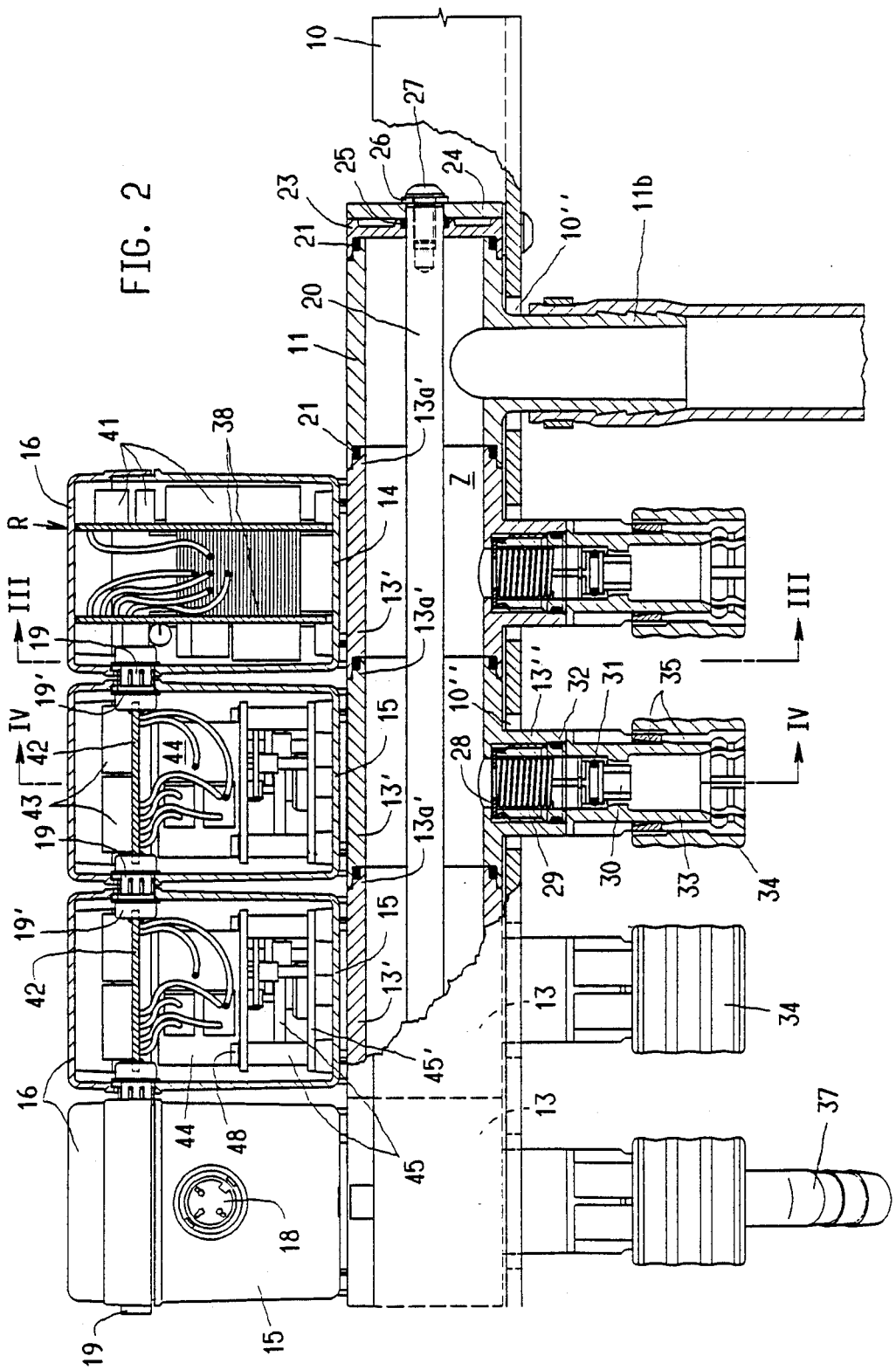
FIG. 2 is a cross-sectional enlarged side view from the distribution and control unit according to FIG. 1.
Figure 3:
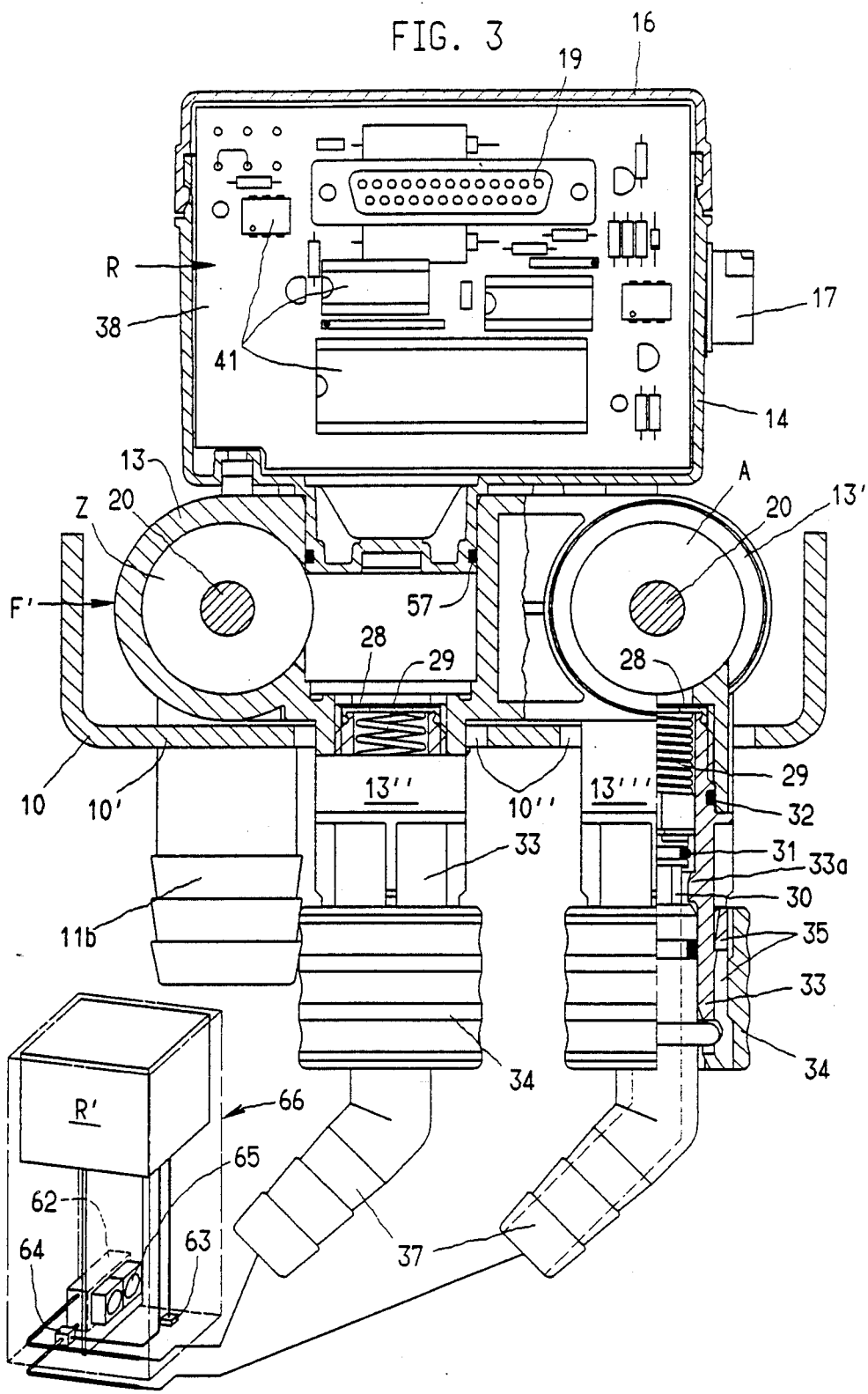
FIG. 3 is a sectional view along lines III—III of FIG. 2 in enlarged representation (right-hand channel section (13') is not in section)
Figure 5:
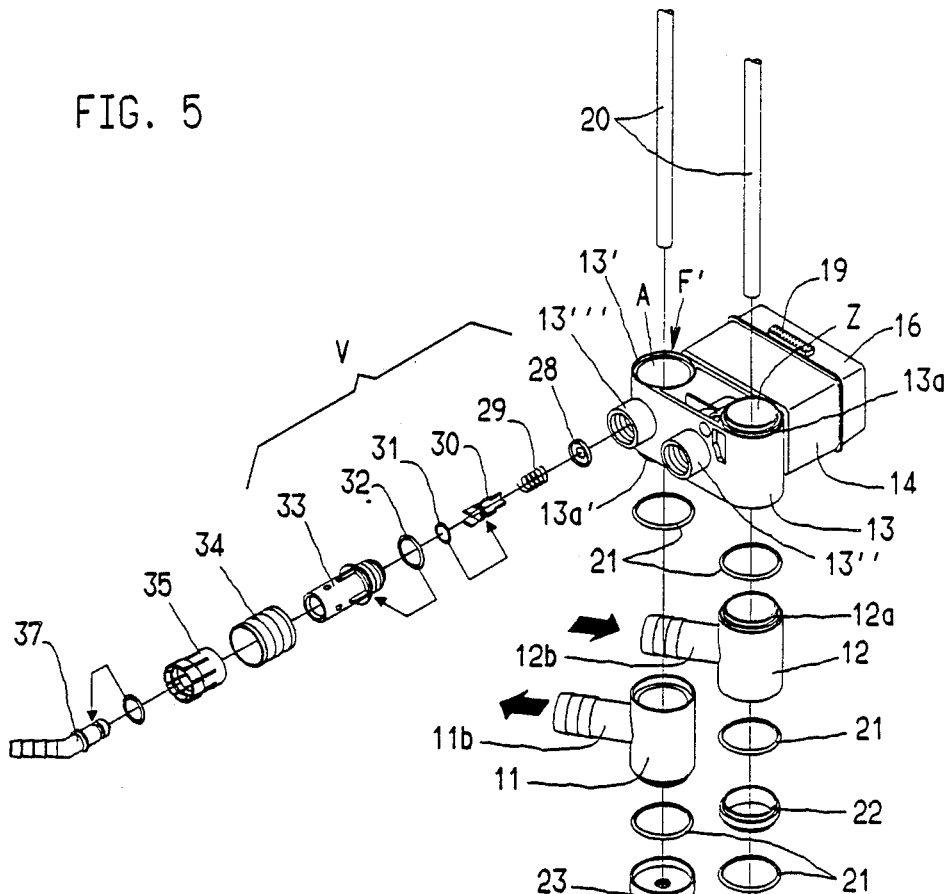
FIG. 5 is an exploded view of the end-positioned fitting of the distribution and control unit according to FIG. 1 with associated computer housing and with a connection of a cooling circuit to the discharge channel as well as with a connection for the supply of the cooling medium represented in an exploded drawing.
Figure 6:
FIG. 6 is a cross-sectional view of the vent channel as viewed from the side of the motor housing.

As can be seen in FIGS. 1 and 3, socket-shaped connection pieces 11, 12 for the supply channel and the discharge channel A are connected via a valve-free, identical branch fitting F'. The fittings F and the branch F' are centered with respect to each other by a front axial centering flange 13a' of the channel sections 13' and a rear axial centering flange 13a of the channel sections 13 of the fittings F or of the branch fitting F', respectively, which centrally engages a corresponding concentric recess of the neighboring fitting F, of the branch fitting F' or of the connection piece 11. All engagement joints are sealed off by means of a respective sealing ring 21 for each (FIGS. 2, 5). Consequently, an axial centering flange 12a of the connection piece 12 for the supply channel Z centrally enters via a sealing ring 21 a corresponding centering recess of the branch fitting F', and the centering flange 13a' of the fitting F centrally enters via a sealing ring 21 a coaxial centering recess of the connection piece 11. The connection pieces 11 and 12 provided with connection nozzles 11b and 12b are covered at their faces by closure caps 23, an adaptor ring 22 being inserted between the closure piece 12 and the closure cap 23. Adaptor ring 22 serves the purpose of replacing the centering flange missing at the face of the connection piece 12 to create the same connection conditions for the closure cap 23 as for the connection piece 11. The tie rods 20, which are axially grasped by bolts 27, act axially on the closure caps via washers 26 and a fastening plate 24, with interposed sealing rings 25, in order to hold together the unit S (FIG. 1). The opposite end of the unit S is similarly designed, and has an adaptor ring 22, closure caps 23, a fastening plate 24, sealing rings 21, 25 as well as bolts 27 and washers 26.

In the identical connection nozzles 13" and 13'" of supply channel Z and discharge channel A, rotationally symmetrical sockets (housing sockets 33) are accommodated coaxially. Shut-off valves V are arranged in these, as can be seen in FIGS. 4,5. These shut-off valves V are designed in such a way that they close automatically upon removal of the attachable connection nipples 37. For this purpose, the valve bodies 30 of the shut-off valves V are held by the attached connection nipples 37 against the action of coaxial spiral springs 29 away from their valve seats 33a (FIG. 3), which are formed by the housing sockets 33 and butt against retaining disks 28. Valve bodies 30 and housing sockets 33 are provided with sealing rings 31, 32. The end sections, projecting axially from the connection sockets 13", 13'", of the housing sockets 33 centered in these connection nozzles are each surrounded by a collet 35. Clamping tongues 35', which project axially beyond the associated housing socket 33, can be converted into clamping position by axial displacement by means of a surrounding clamping ring 34. In the clamping position these clamping tongues 35' grasp an annular rib 37' of the connection nipple 37.

The computer R is accommodated in a computer housing 14 connected to the branch fitting F' which has a design identical to the design of the motor rear housings 15 of the remaining fittings F. The computer housing 14, likewise closed off at the rear by a cover 16, has two parallel printed circuit boards 38 with electronic components 41. These are fixed parallel and symmetrical to the valve axis v—v of the neighboring turning valve K in the computer housing 14. The motor gear housings 15 are electrically interconnectd by means of plug connections 19, 19' (receptacle part 19 and pin part 19'). On each of the motor gear housings 15, there is on one narrow side a receptacle 18 for the line leading to the sensor at the cooling zone of the cooling circuit (sensor line). The identical computer housing 14 has a similarly arranged multi-pin connection 17 for connecting the supply line to the central computer R' of the plastic injection molding machine.

The cooling circuit starting from the valve-free branch fitting F' leads to the switch cabinet 61 which houses the central computer R' of the plastics injection molding machine. This switch cabinet can be closed air-tight. It contains a heat exchanger 62 which is in the cooling circuit. The cooling circuit is controlled with the air of a thermocouple 63 via the central computer R by a shut-off valve 64 which opens whenever the set temperature is exceeded. An air-circulating unit 65, in particular a fan, is arranged in the switch cabinet 61 and provides an increased air circulation in the switch cabinet.

Connecting lines 40 (not shown) connect to the connection 17. Connecting lines 38 connect to the sensor connections 18. Electric components 41 are connected to central computer R. Electric components 43 are connected to printed circuit board 42. The design of the control unit S from identical fittings F; F' and identical associated motor gear housings 15 as well as an identical computer housing 14 makes possible an increase or decrease of the number of cooling circuits by linking or deleting the fittings F without significant effort. A ribbon cable (not shown) connects to the sensor connections 18.

What is claimed is:

1. An apparatus for maintaining the temperature of cooling circuits of an injection molding machine, comprising:
   a plurality of fittings connectable to one another to form the cooling circuits, each fitting comprising a supply channel section and a discharge channel section which are spaced from one another, the fittings being sealingly attached to one another so that their respective supply channel sections form a supply channel and their respective discharge channel sections form a discharge channel, each fitting further comprising a connection nozzle communicating with the supply channel and means for controlling the flow rate of cooling fluid through the supply channel section to the connecting nozzle, comprising:
   a stepping motor;
   means for controlling the operation of the stepping motor in response to detected cooling criteria;
   a valve channel positioned between the supply section and the connection nozzle; and
   a ceramic turning valve having:
   a valve body disk with ceramic sealing surfaces;
   a valve seat disk positioned within the fitting, the valve body disk being in contact with the valve seat disk along its ceramic sealing surfaces, the valve body disk being connected to the stepping motor for rotation thereby so as to rotate relative to the valve seat disk and the valve body disk being selectively rotatable by operation of the stepping motor so as to rotate relative to the valve seat disk, whereby passage of cooling fluid from the connection nozzle to the supply channel section can occur when the valve body disk is rotated to selected open positions relative to the valve seat disk and whereby passage of cooling fluid is prevented when the valve body disk is rotated to selected closed positions relative to the valve seat disk.

2. An apparatus as claimed in claim 1 wherein each fitting further comprises an annular shoulder disposed at one end of the connection nozzle for receiving the valve seat disk.

3. An apparatus as claimed in claim 1, further comprising a pretensioned spring in each fitting positioned to press the valve body disk against the valve seat disk.

4. An apparatus as claimed in claim 1, wherein each valve seat disk and its corresponding valve body disk comprise diametral, arc-shaped flow slits which are open and closed with respect to the connection nozzle so as to permit or prevent passage of cooling fluid.

5. An apparatus as claimed in claim 1, further comprising tie rods coaxially disposed in the supply channel sections of each fitting and adapted to interconnect the fittings to one another.

6. An apparatus as claimed in claim 5, wherein the valve chamber of each fitting communicates with the supply channel of each fitting via symmetrical channel sections.

7. An apparatus as claimed in claim 1, further comprising a fitting disposable at one end of the plurality of interconnected fittings and a computer housing attached to the end fitting.

8. An apparatus as claimed in claim 1, wherein each fitting further comprises a connection nozzle communicating with the discharge channel and each connection nozzle to the supply and discharge channel sections comprise sockets and each socket is provided with a shut-off valve for automatically closing off the connection nozzles when an attachable connection nipple is removed from the socket.

9. An apparatus as claimed in claim 1, wherein each stepping motor is housed in a cuboid motor gear housing having a cylindrical molded attachment.

10. An apparatus as claimed in claim 1, further comprising a bridge having a u-shaped support rail for supporting the fittings.

11. An apparatus as claimed in claim 1, further comprising a thermocouple and a heat exchanger which are operatively connected to each cooling circuit.

12. A cooling circuit for an injection molding machine comprising:

an apparatus for maintaining the temperature of cooling circuits of an injection molding machine, comprising:

a plurality of fittings connectable to one another to form the cooling circuits, each fitting comprising a supply channel section and a discharge channel section which are spaced from one another, the fittings being sealingly attached to one another so that their respective supply channel sections form a supply channel and their respective discharge channel sections form a discharge channel, each fitting further comprising a connection nozzle communicating with the supply channel and means for controlling the flow rate of cooling fluid through the supply channel section, comprising:

a stepping motor; means for controlling the operation of the stepping motor in response to detected cooling criteria;

a valve channel positioned between the supply section and the connection nozzle; and a ceramic turning valve having a valve body disk with ceramic sealing surfaces a valve seat disk positioned within the fitting, the valve body disk being in contact with the valve seat disk along its ceramic sealing surface, the valve body disk being connected to the stepping motor for rotation thereby so as to rotate relative to the valve seat disk and the valve body disk being selectively rotatable by operation of the stepping motor so as to rotate relative to the valve seat disk, whereby passage of cooling fluid from the connection nozzle to the supply channel section can occur when the valve body disk is rotated to selected open positions relative to the valve seat disk and whereby passage of cooling fluid is prevented when the valve body disk is rotated to selected closed positions relative to the value seat disk.

* * * * *